United States Patent [19]

Tümer et al.

[11] Patent Number: 5,696,458
[45] Date of Patent: Dec. 9, 1997

[54] FRONT END DATA READOUT CHIP

[75] Inventors: Tümay O. Tümer; Bo Pi, both of Riverside; Frank L. Augustine, Encinitas, all of Calif.

[73] Assignee: Nova R&D, Inc., Riverside, Calif.

[21] Appl. No.: 460,489

[22] Filed: Jun. 2, 1995

[51] Int. Cl.[6] .............................. H04B 17/00; G06F 11/10
[52] U.S. Cl. .................. 327/69; 327/51; 327/70; 327/71; 327/77; 327/80; 327/94
[58] Field of Search .................. 327/50, 69, 70, 327/71, 51, 58, 18, 80, 94

[56] References Cited

U.S. PATENT DOCUMENTS

| | | | |
|---|---|---|---|
| 3,430,197 | 2/1969 | Brown | 327/69 |
| 3,863,056 | 1/1975 | Klein | 327/69 |
| 3,900,744 | 8/1975 | Lammers | 327/58 |
| 4,556,982 | 12/1985 | Dunn | 327/71 |

Primary Examiner—Timothy P. Callahan
Assistant Examiner—Dinh T. Le
Attorney, Agent, or Firm—David G. Beck; Townsend and Townsend and Crew LLP

[57] ABSTRACT

A multi-channel readout chip is provided in which each channel has an analog section and a digital section. Each channel of the readout chip employs low noise charge amplifiers with self trigger and calibration capabilities to provide timing information with better than 20 nanosecond precision. The trigger threshold can be adjusted to provide energy discrimination. The chip has a sparse readout function in which only the channels which have received signals greater than a preselected threshold value are readout, thus providing fast data acquisition capabilities.

23 Claims, 9 Drawing Sheets

FRONT END DATA READOUT CHIP

The present invention relates generally to data acquisition systems, and more particularly to a front end electronics readout chip.

BACKGROUND OF THE INVENTION

The successful application of solid state detectors such as silicon strip detectors for high energy physics experiments was largely due to the development of multi-channel front-end readout electronics mixed signal Application Specific Integrated Circuits (ASIC) chips, such as the SVX and Amplex chips. Without these monolithic CMOS chips high resolution particle detectors would not be practical. These chips were read out in conjunction with an external trigger supplied by the particle accelerator supplying the particle beam to the experiment. The trigger notifies the control electronics when to read the ASIC chips.

Physics, medicine, materials science, non-destructive evaluation, manufacturing, and environmental science are in need of room temperature, high resolution, and/or position-sensitive radiation detectors. The present scintillator and CCD-based technologies either cannot produce high resolution imaging or do not have the sensitivity. Room temperature radiation detectors are the driving force behind the current effort to develop II–VI semiconductor materials. A room temperature, position-sensitive, high resolution technology such as silicon strip, silicon drift, or silicon pixel detectors coupled to dedicated readout electronics may fill many of the demands of the new detection applications and push radiation imaging to a new level of resolution and flexibility. Unfortunately, the ASIC chips developed for high energy physics experiments cannot be used for most commercial applications such as medical and industrial imaging where an external trigger signal is unavailable.

A front end electronics readout mixed signal ASIC chip normally has a large number of identical channels within a single monolithic chip. The channel number typically ranges from 4 to 256. Newer versions with more channels may be fabricated as narrower (i.e., less than 1 micrometer) processing capabilities become available. One of the principal benefits of these chips is the ability to handle the readout from detectors with extremely large numbers of channels. Because these chips can amplify minute amounts of charge produced by the detectors they are subject to noise problems. In order to reduce the noise, the chips are typically mounted very close to the detector element, strip, pad, or pixel. The detector elements, strips, pads, or pixels are then connected directly or indirectly with the shortest possible length to the input of the ASIC chip. The power supply rails have to be bypassed very close to the ASIC chip as well. The control and output signals are connected to control electronics which controls and interfaces the ASIC chip to the host computer.

Most conventional ASIC chips can only handle low capacitance inputs. They have fixed peaking times, no self trigger output, and either no sparse readout capability or only straight sparse readout capability.

From the foregoing, it is apparent that an ASIC chip which is suitable for use in the developing industrial and medical imaging fields is desirable.

SUMMARY OF THE INVENTION

The present invention provides a front end multi-channel readout chip which can be used with a variety of different detectors. Each channel of the readout chip consists of an analog section which provides analog output signals on an A Bus, and a digital section which provides fast trigger signals on a T Bus. Input from a detector goes directly into a low noise charge sensitive amplifier. The output of the charge sensitive amplifier goes into an externally switchable inverter and two shaper amplifiers; a fast and a slow shaper. The inverter enables the use of both positive and negative input signals. A two stage trigger circuit consists of two comparators after the fast and slow shaping amplifiers. The first comparator provides a fast trigger signal with small timing jitter through a precision threshold level. The second comparator provides a slower trigger signal than the first but has high noise immunity. Therefore the second comparator is used to produce the true event trigger and also to label the channels that have a signal. The fast and slow triggers from all of the channels are sent to two separate OR circuits to produce the external fast and slow trigger outputs. The trigger outputs signal the external readout interface that an event has occurred, provide an accurate timing of the event, and discriminate between valid event data and noise. There are three readout modes for the preferred embodiment of the chip: (i) a sparse readout mode which allows the readout of only the detector strips that have a signal; (ii) a nearest neighbor readout mode which allows the readout of the detector strips with a signal and the two nearest neighbors; and (iii) an all channel readout mode which allows the readout of all the channels of the chip in sequence.

A further understanding of the nature and advantages of the present invention may be realized by reference to the remaining portions of the specification and the drawings.

DESCRIPTION OF SPECIFIC EMBODIMENTS

The readout chip of the present invention is designed as a mixed signal ASIC CMOS chip. Although the preferred embodiment of the chip has 64 channels, the same basic design can be used with either fewer or greater numbers of channels (i.e., 16, 32, 128, etc.). Both solid state and semiconductor detectors such as silicon strip, silicon pixel, silicon drift, silicon PIN photodiodes, germanium, CdZnTe, CdTe, and $HgI_2$ detectors can be used with the present invention.

Figure 1:
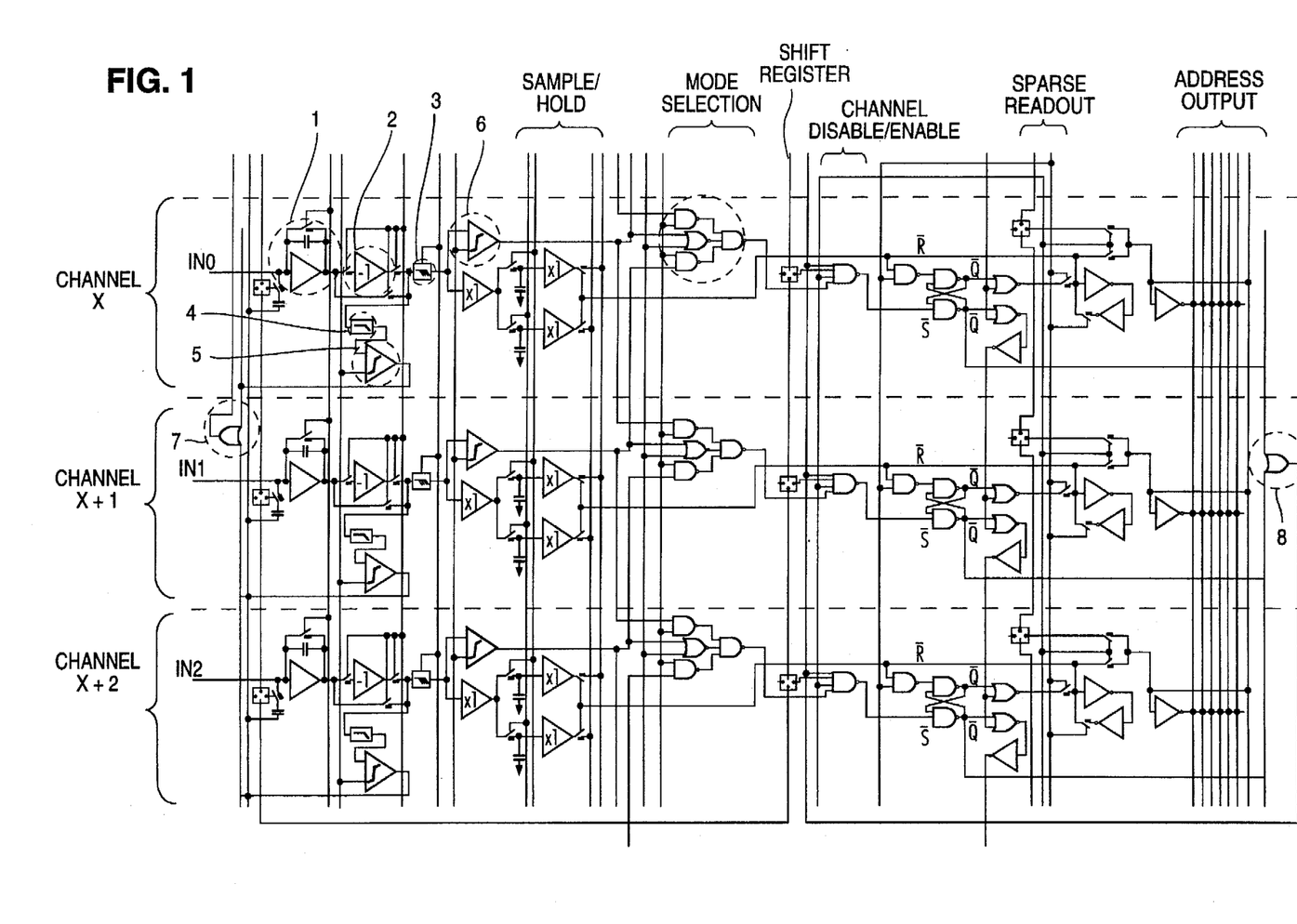
FIG. 1 is an illustration of a circuit diagram for the invention.

FIG. 1 is an illustration of a circuit diagram for the preferred embodiment of the invention. Only three channels are shown in FIG. 1. Each channel of the readout chip consists of an analog section which provides analog output signals on an A Bus, and a digital section which provides fast trigger signals on a T Bus. Input from a detector goes directly into a low noise charge sensitive amplifier 1. The output of charge sensitive amplifier 1 goes into an optional inverter 2 and a slow shaper amplifier 3 and a fast shaper amplifier 4. Inverter 2 enables the use of both positive and negative input signals. A two stage trigger circuit consists of a fast comparator 5 and a slow comparator 6. Comparator 5 provides a fast trigger signal with small timing jitter through a precision threshold level. Comparator 6 provides a second trigger signal which is slower than the first trigger but has high noise immunity and high accuracy and therefore is used to signal a true event and to label the channels that have a signal. The fast and slow triggers from all of the channels are sent to two OR circuits 7 and 8, respectively, to produce the external fast and slow trigger outputs to signal the external readout interface that an event has occurred, the accurate time of the event, and that the readout chip contains valid data. There are three readout modes for the preferred embodiment of the chip: (i) a sparse readout mode which allows the readout of only the detector strips that have a signal; (ii) a nearest neighbor readout mode which allows the readout of the detector strips with a signal and the two nearest neighbors; and (iii) an all channel readout mode which allows the readout of all the channels of the chip in sequence.

Figure 2:
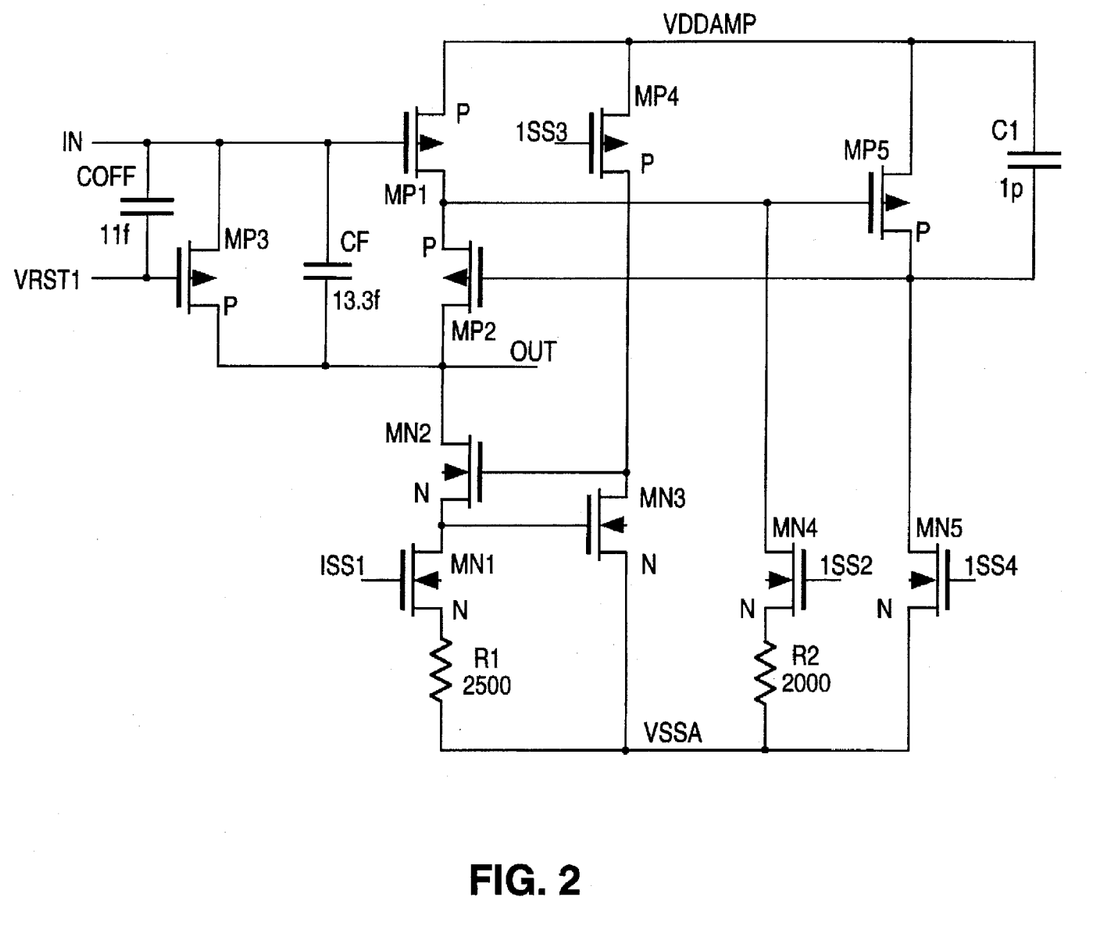
FIG. 2 is a schematic illustration of a charge sensitive amplifier.

FIG. 2 is an illustration of a schematic of a charge sensitive amplifier according to the present invention. The charge sensitive amplifier normally has to have as much open loop gain as possible. This is especially important if large capacitance detectors are connected to the input. If the open loop gain of the amplifier is too small then the applicable trigger threshold discussed below will become larger and larger with the decrease in open loop gain. Therefore the readout chip of the present invention has a very large open loop gain achieved by using an active cascode section.

The charge sensitive amplifier is a very high input impedance amplifier with a capacitive integrator. It integrates the charge (i.e., sums it on to the capacitor) and keeps it at that level. Thus its output rises as the charge coming in from the input detector builds up on the capacitor. Once there is no further input charge, the output level stays at the final level reached. Although this output may be used directly, in the preferred embodiment of the invention shaper amplifiers are used to shape the integrated signal. Without the shaper amplifiers the output signal of the integrator would remain at a high level for a long period of time, thus potentially leading to the improper integration of future detected events or to event pile up.

In the preferred embodiment, three shaper amplifiers are used per charge sensitive amplifier. The shapers work with a number of integrator and differentiator amplifier stages placed in series. The shapers integrate and differentiate the charge sensitive output to form an approximately inverted bell shaped pulse. In the preferred embodiment of the invention, the rise and fall times can be controlled accurately to achieve the desired pulse shape and duration.

Figure 3:
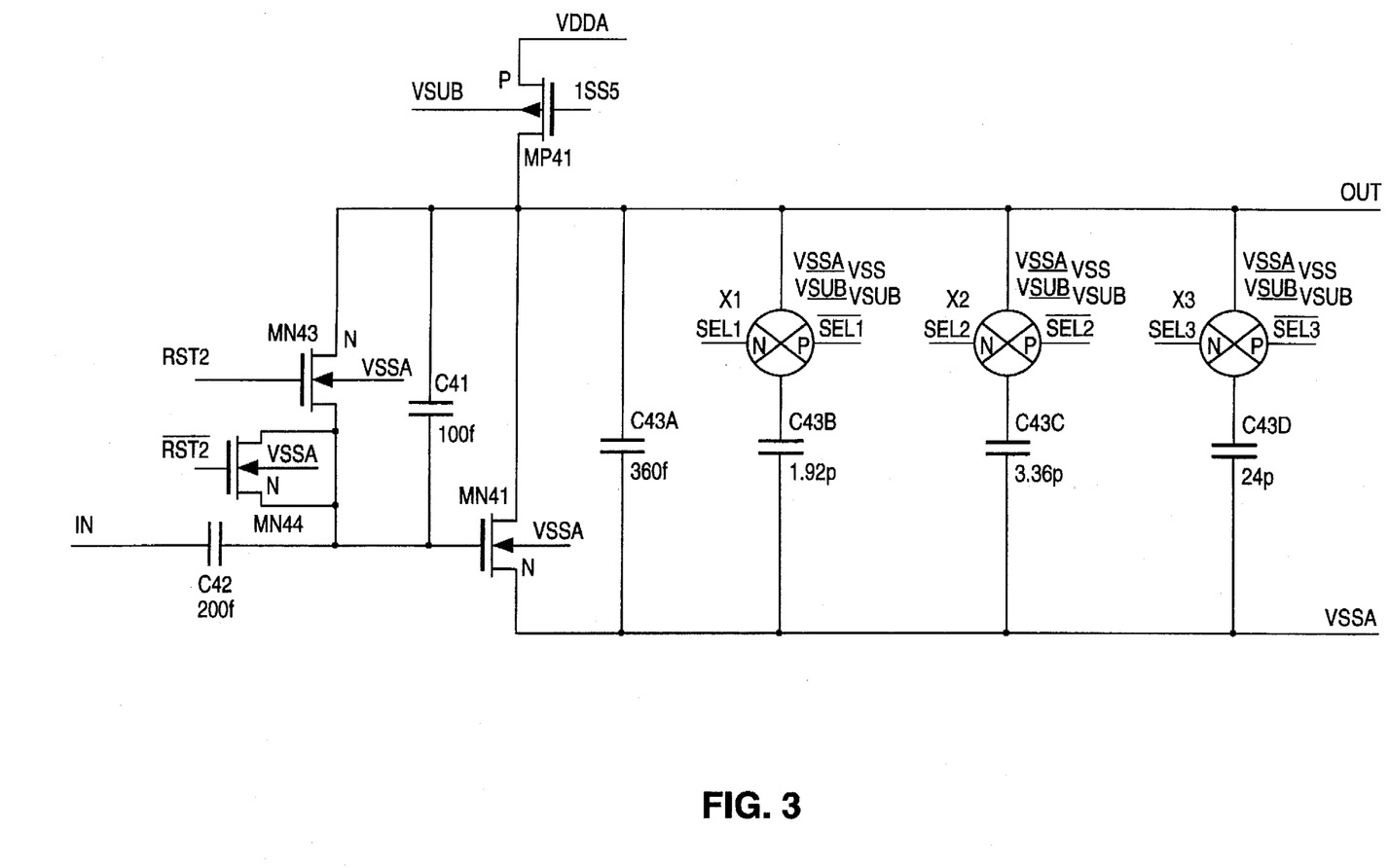
FIG. 3 is a schematic illustration of shaper amplifier I.
Figure 4:
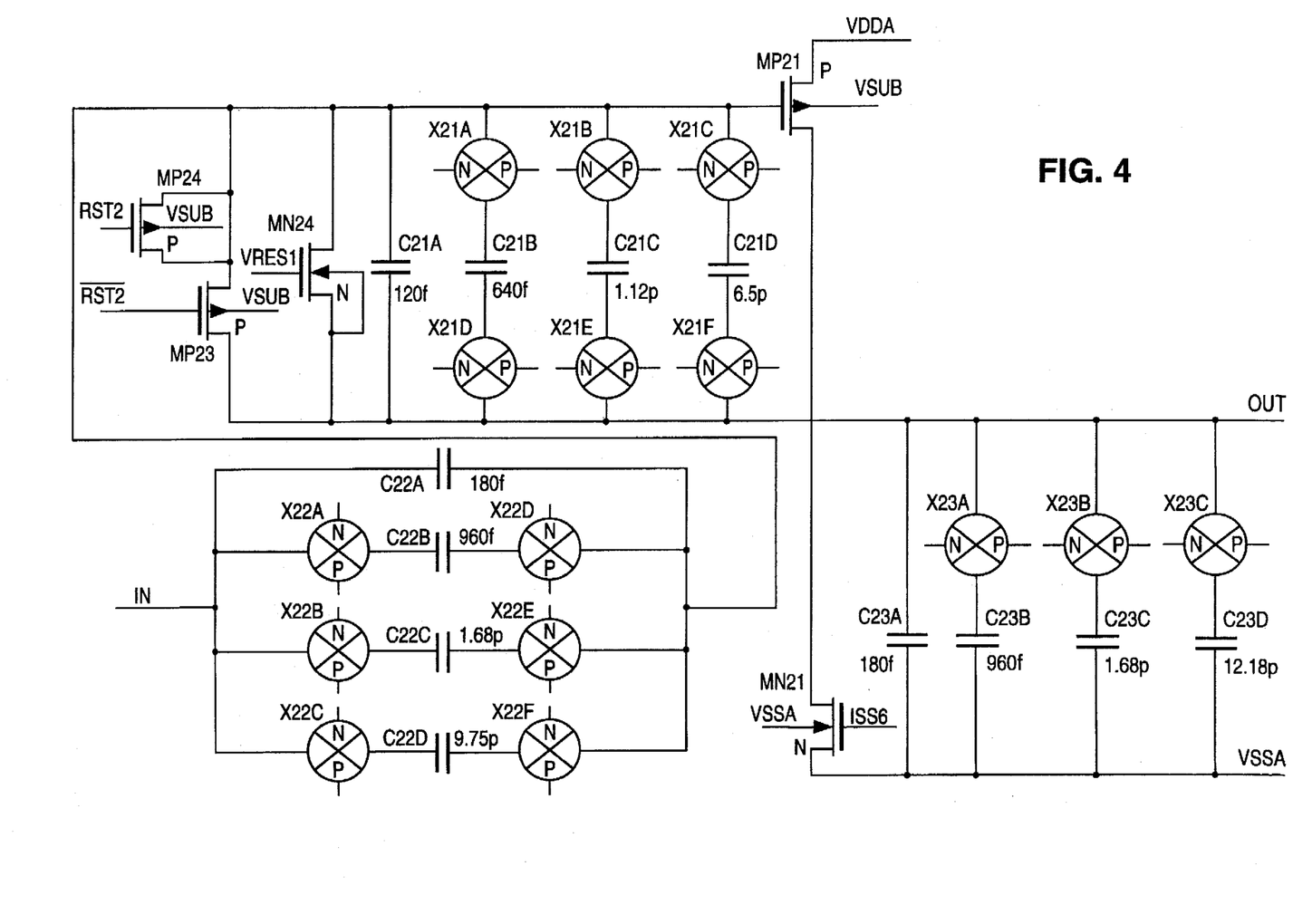
FIG. 4 is a schematic illustration of shaper amplifier II.
Figure 5:
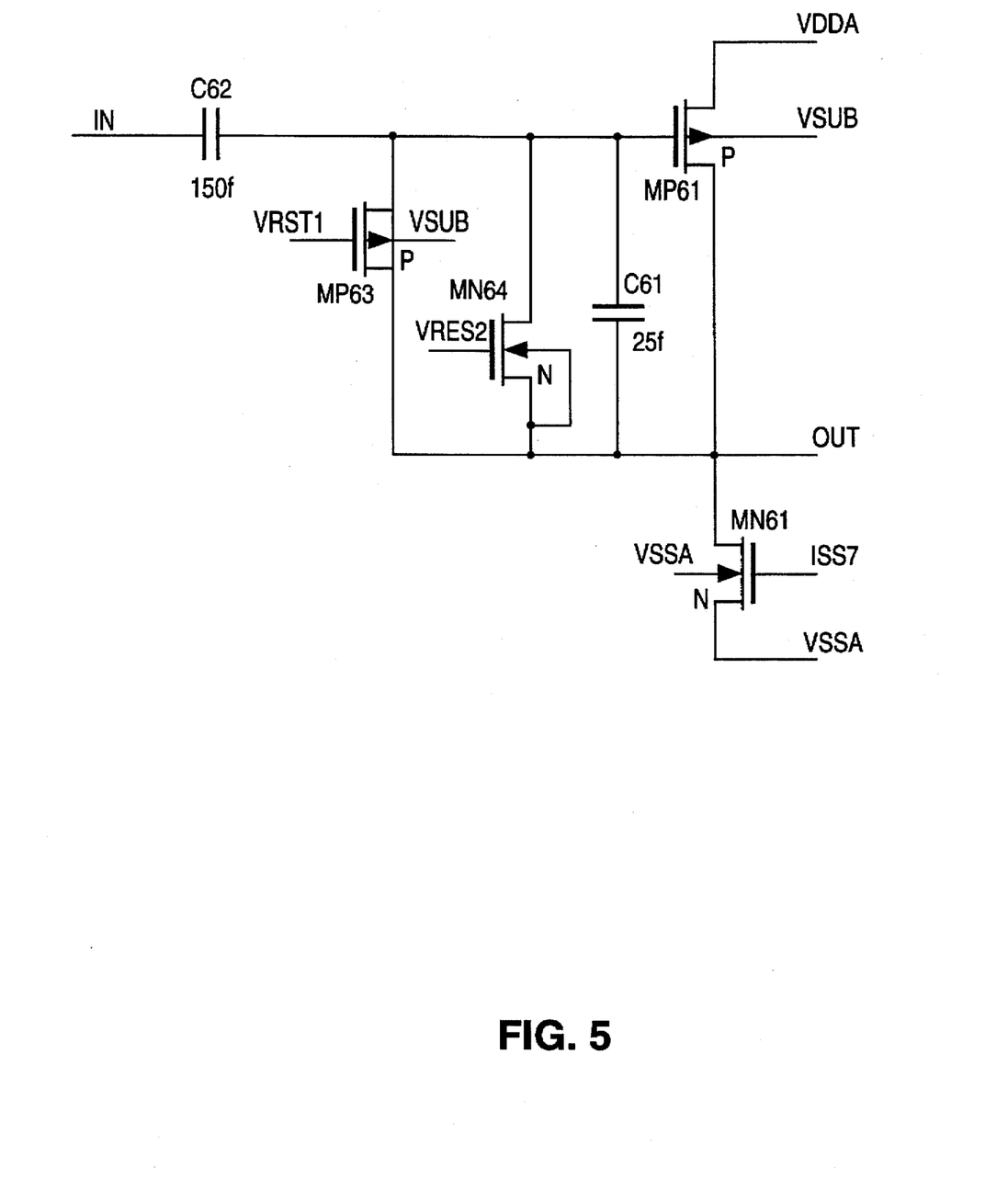
FIG. 5 is a schematic illustration of shaper amplifier III.

The first shaper is a slow shaper and is actually comprised of shaper amplifiers I and II. Shaper amplifier I is an integrator and is schematically illustrated in FIG. 3. Shaper amplifier II is a combined differentiator and integrator and is schematically illustrated in FIG. 4. In this embodiment one of four possible peaking times may be externally selected; 200 nanoseconds, 500 nanoseconds, 1 microsecond, and 4 microseconds. Furthermore, by using different combinations a total of seven different peaking times may be selected. The readout chip can be designed to have peaking times ranging in value from 20 nanoseconds to 100 microseconds. The second shaper is comprised of a single shaper amplifier III, as schematically illustrated in FIG. 5. Shaper amplifier III is only a fast differentiator and is used to produce the fast self trigger output. In the preferred embodiment there is very little external adjustment of the peaking time of this amplifier. However, in an alternate embodiment, the peaking time of this amplifier is adjustable.

Figure 6:
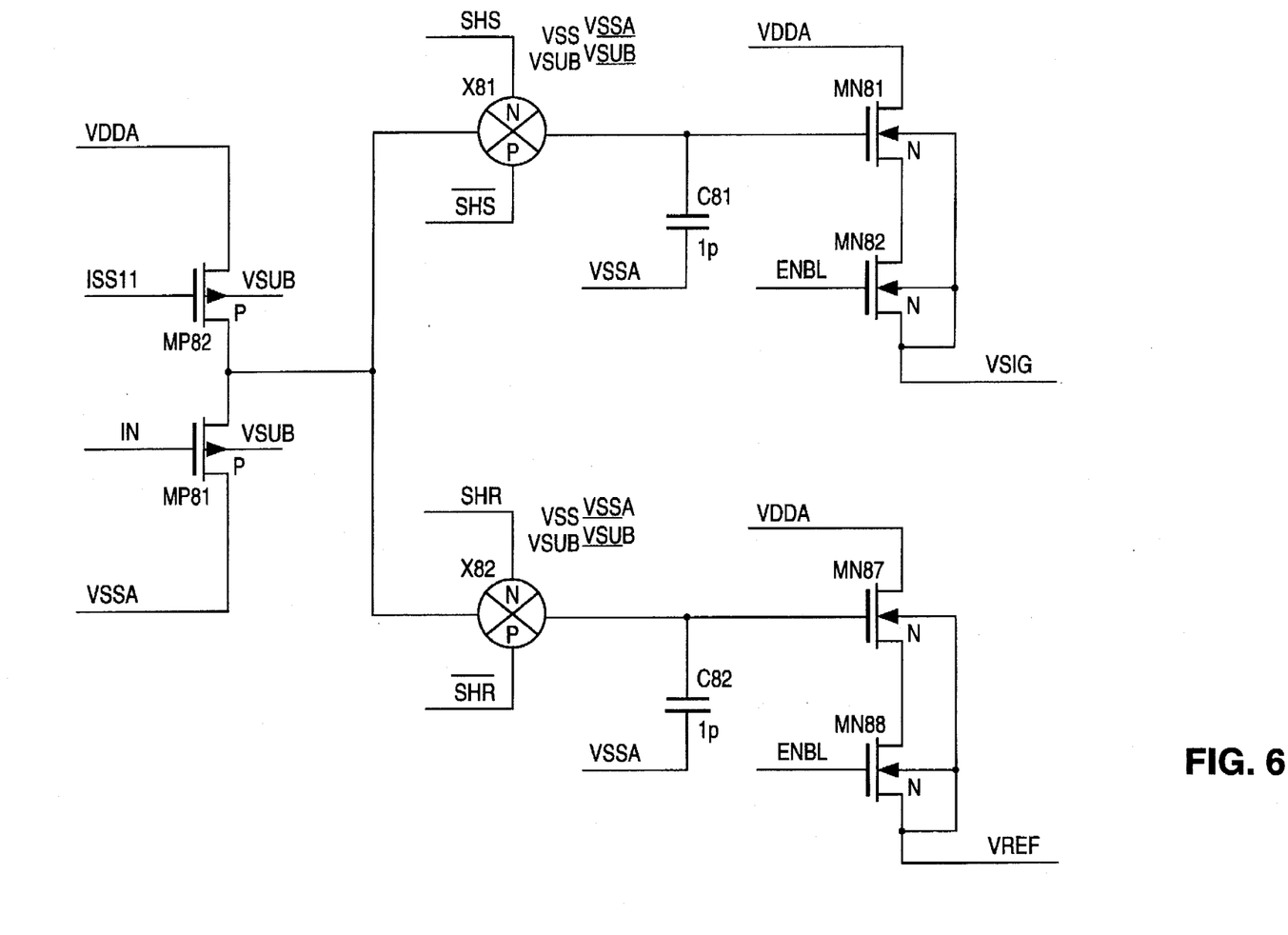
FIG. 6 is a schematic illustration of a sample-and-hold circuit.
Figure 7:
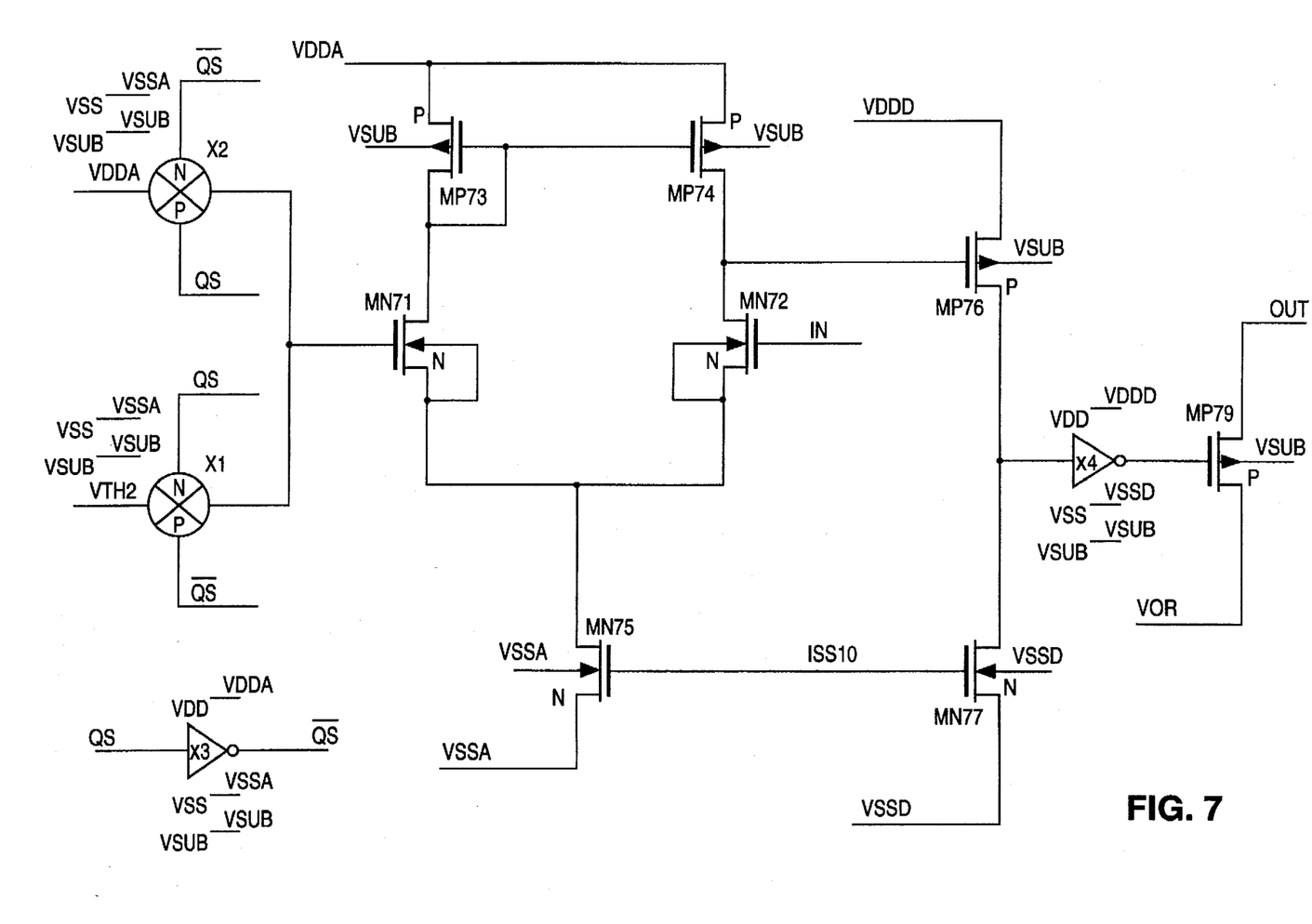
FIG. 7 is a schematic illustration of fast comparator I.

In the preferred embodiment, to measure the amount of a charge received by the readout chip from a detector the height of the shaped pulse must be held at the peak until it is digitized. In order to maintain the height a sample-and-hold (hereinafter "S/H") circuit as schematically illustrated in FIG. 6 is implemented. The basis of this circuit is a capacitor which stores the charge from the shaper amplifier and a high quality switch. As soon as the shaped pulse reaches the peak, the switch must be closed to prevent it from discharging. Thus a fast and accurate signal is needed which shows when the charge has arrived at the input. In the preferred embodiment of the present invention, this is accomplished by the second fast shaper amplifier III and a fast comparator I. Fast comparator I is schematically illustrated in FIG. 7. The combination of shaper amplifier III and comparator I gives a fast trigger signal which is accurate in time and can be used to set the S/H accurately at the peak. This combination can also be used for external applications such as timing the incoming pulse accurately or establishing or requesting coincidence between different detectors.

Figure 8:
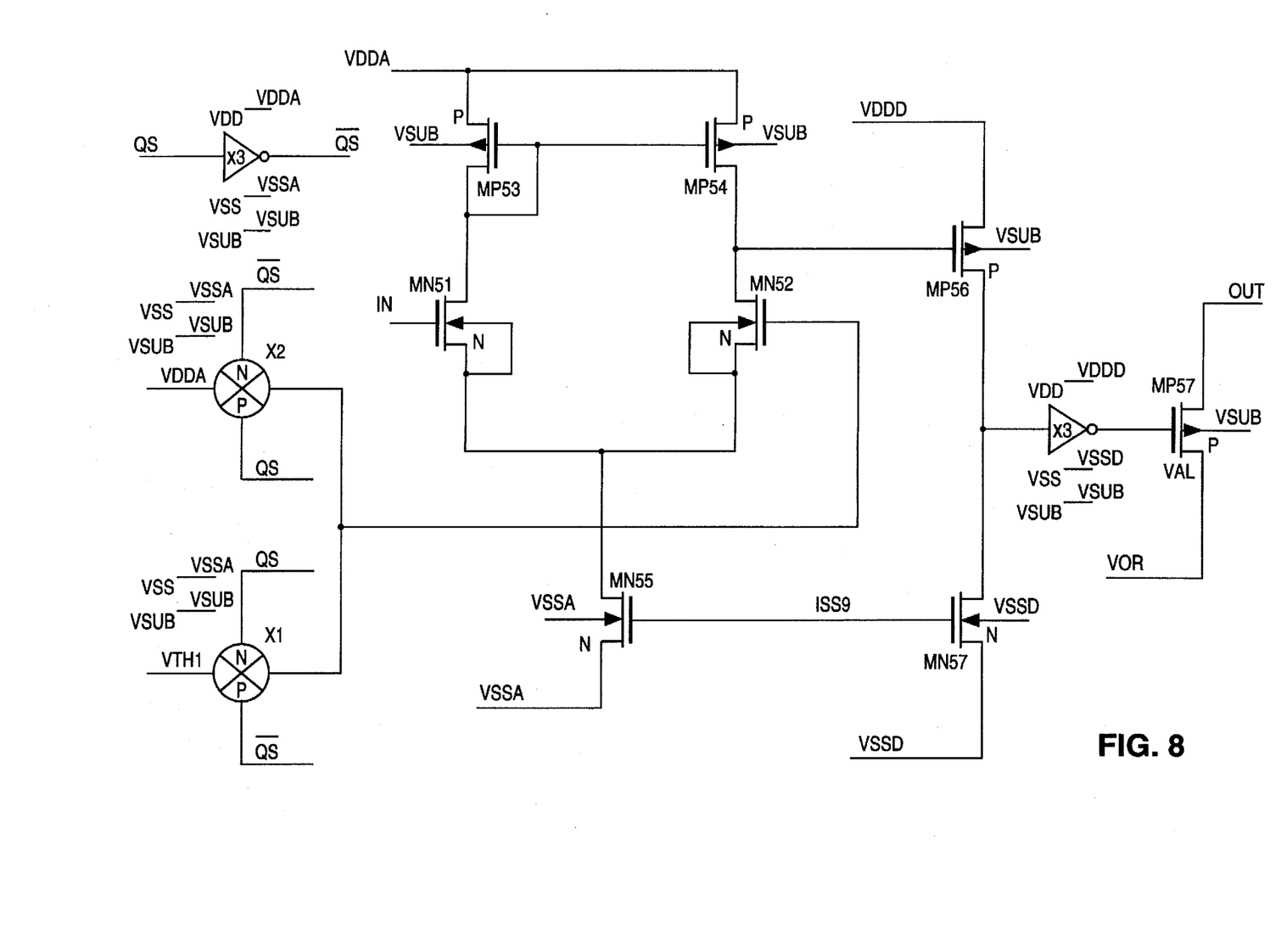
FIG. 8 is a schematic illustration of slow comparator II.

Although the fast self trigger output is accurate in time, it is not necessarily accurate as to whether the signal is real. This phenomena is due to the combination of comparator I having a low threshold and shaper amplifier III being very fast. Thus simple noise pulses can cause a false trigger. To avoid this effect a second slow self trigger system is used which is connected to the slow shaper and goes to a slow trigger comparator II. Comparator II is schematically illustrated in FIG. 8. The slow self trigger system uses a higher threshold and a slower shaped pulse than in the fast self trigger system. Thus the slow self trigger output is reliable in identifying the occurrence of a real event, however it is less accurate in time.

By using a combination of the fast and slow self trigger systems, an accurate trigger both in time and in establishing whether or not an actual event has occurred is established. Thus in use, the time counter is initiated as soon as there is a signal from the fast trigger thereby insuring an accurate timing for the S/H circuit. If no output signal is detected from the slow trigger, the counter is reset in readiness for another event. If, however, an output signal is detected from the slow trigger, then a real event has occurred and the data being held by the S/H circuit can be digitized.

In an alternate embodiment, the S/H circuits are replaced with peak holding circuits. Peak holding circuits are well known by those skilled in the art.

Figure 9:
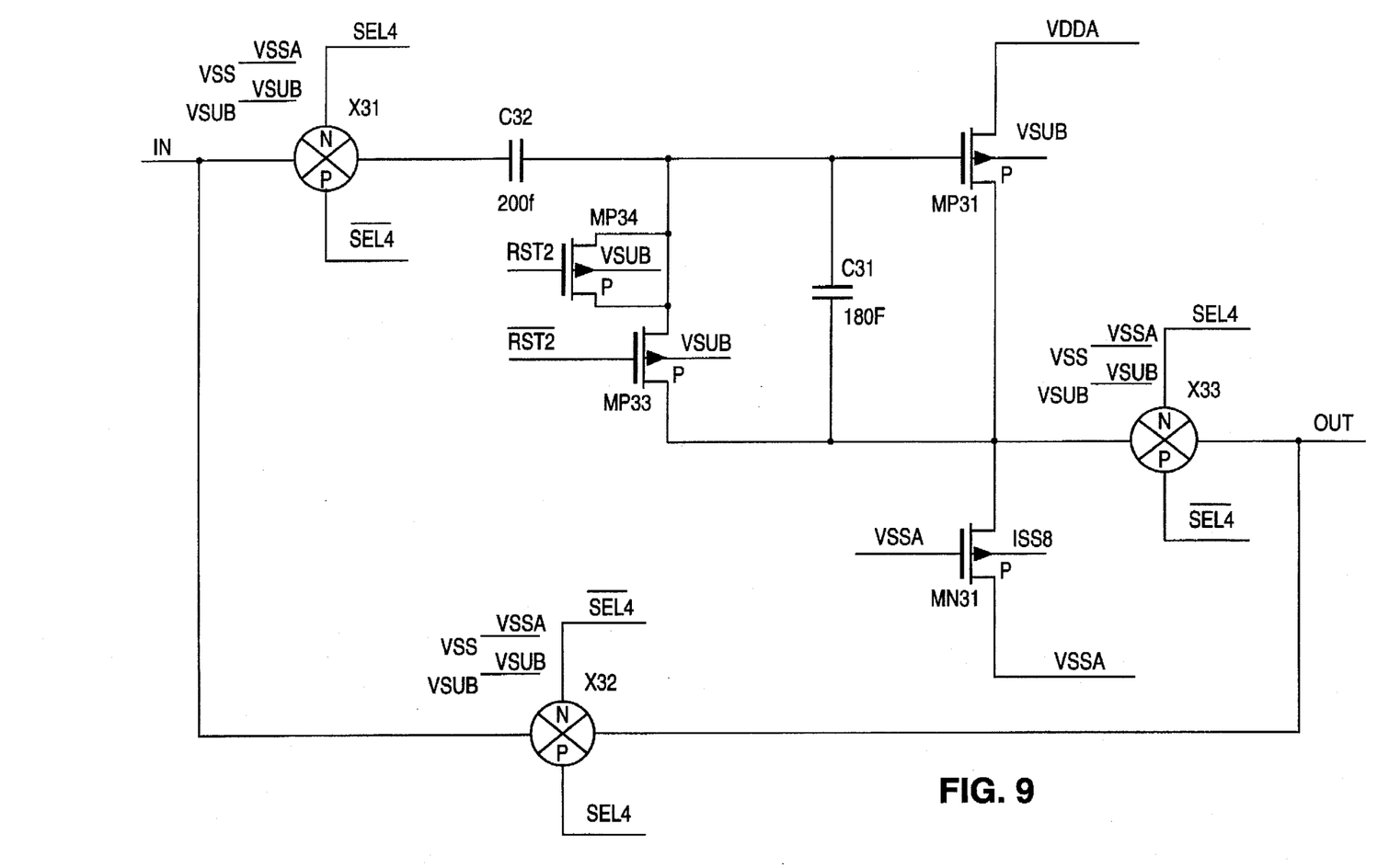
FIG. 9 is a schematic illustration of an inverter amplifier.

The input of the readout chip can be programmed externally to accept positive or negative charge. To accomplish this the charge sensitive amplifier is constructed such that it can accept both polarity charge signals. Since the shaper amplifiers can only handle one polarity signal, an inverter amplifier is inserted between the charge sensitive amplifier and the shaper amplifiers. The inverter amplifier schematically illustrated in FIG. 9 is designed to be switched into the circuit only if the input polarity needs to be reversed.

The preferred embodiment of the invention contains two S/H systems in parallel per channel. This feature allows the sampling of the input signal at different parts of the shaped signal, the user determining the parts of the signal to be sampled. For example, the signal can be sampled both at the peak and down the tail, thus allowing both the peak height and the tail to be measured. It may also be used for pedestal subtraction.

Each of the trigger output comparators compare the input coming from the shaper amplifiers to an externally set threshold voltage level. When the input level is below the threshold voltage the circuit is at its normal output level. If the input level passes over the threshold voltage the circuit switches to a different output level and only returns back to its normal output level when the input voltage level falls back below the threshold voltage. Therefore the output of the comparator circuits is a pulse of a duration corresponding to the time that the input pulse is over the threshold voltage.

The switching feature of the comparators can lead to cross talk within the system. In the preferred embodiment of the present invention this problem is minimized by having small switching levels in the fast comparator I. Although the slow comparator II switches from a minimum level of approximately 0 volts to approximately 5 volts, the fast comparator I is designed to switch between very small levels; approximately 4.5 volts to 5 volts, for about a 0.5 volt difference between switching levels. If desired, slow comparator II can also be designed to switch between very small levels.

Although the preferred embodiment of the present invention has 64 channels on a single monolithic chip, either fewer or greater numbers of channels can similarly be placed on a single monolithic chip. If desired, the charge sensitive amplifier, the inverter amplifier, the shaper amplifiers, and all of the related peripheral circuits can be placed on one chip while the comparators, the S/H circuits, and the remaining digital circuits such as the shift register, the OR circuit, the address encoder, and the sparse readout logic on a second chip. Other combinations can also be selected for dividing the circuitry between two or more chips. Separating the circuitry into two or more chips can increase the yield while minimizing cross talk and noise in the chips.

In the preferred embodiment, the slow triggers from each channel go to an OR circuit and produce the slow trigger output from the chip. They also go to a logic system and are latched to a register. Once the slow trigger fires, it is considered a real event and the readout sequence is started by the external control. The external control has already started the S/H counter on the basis of the fast trigger. Therefore as soon as the slow trigger fires it must wait until the right number of counts have been reached by the S/H counter. Next, an S/H signal is applied in order to hold the slow shaper amplifier output at its peak value. As soon as the S/H is applied, the external control activates the chip read enable line. This causes the chip to connect the analog output (i.e., the output of the S/H circuit) of the appropriate channel to the output, the appropriate channel being defined by the previously selected readout mode. Second, it outputs the encoded address of that channel. For example, if the chip has 64 channels then the individual channel addresses are encoded into 6 bits (e.g., channel 1 is 000001, channel 2 is 000010, etc.). These 6 lines are digital and connected to the outside by 6 channel address output lines. Therefore, the external controller reads the channel address and digitizes the analog output of that channel and sends a clock pulse to the chip to advance it to the next channel according to the selected readout mode. When the chip reaches the last channel with data it sends a signal out on the last channel line. The external controller then reads the last channel and sends a reset pulse to the chip to reset all channels. It removes all of the charge accumulated in the charge sensitive amplifiers, the shapers, etc. It also clears all of the registers and resets all of the necessary components in the ASIC chip so that it will be ready to receive the next event.

The shift register contents are connected to the readout chip's analog output in three modes:

(i) Read all channels: one by one the output of each channel S/H circuit is connected to the chip output for readout.

(ii) Sparse readout: read out only the channels which contain data. Sparse readout logic quickly scans the channels which do not have an output (i.e., no slow trigger) starting from the first channel and stopping at the first channel that has data. This channel is connected to the chip analog output for readout. Also the address of this channel is connected to the address output. After it is read out scanning is reinitiated until the next channel containing data is found. This process continues until the last channel has been scanned or read at which time a signal is sent signifying that chip readout is complete.

(iii) Sparse readout with readout from the adjacent or nearest neighbor channels: in this mode not only the channels containing data but also the channels immediately before and after the data containing channel or consecutive data containing channels are read out. This mode is important in those situations in which there is charge sharing between detector channels. Although the charge in the adjacent channels may be insufficient to overcome the threshold and provide a trigger, these channels may contain sufficient charge to be important in determining the centroid of all the inputs in that section of the detector.

Regardless of the output mode selected, after the last readout the readout chip signals the external control that it is complete. The external control then sends a pulse to reset the readout chip so that all charges in the inputs are cleared and the register are reset so that the chip is ready for the next event.

In the preferred embodiment of the present invention, the user can send a serial code to the chip which selects the status of each channel; either on or off. Thus even if one or more of the detector's channels are faulty, the associated channels of the readout chip can be turned off and the rest of the chip used in its normal capacity.

Another aspect of the preferred embodiment of the invention is a gate before, after, or within slow trigger comparator II which can be opened or closed, depending upon an external signal. This feature allows the computer to close the gate during resetting and other functions so that if there is feedback into the front end it will not trigger the chip prematurely.

The output readout system can be daisy chained between several readout chips. This feature allows a number of readout chips to be used in series, thus reducing the associated readout electronics. In contrast, if the readout chips were operated in parallel mode all the chips would need to be readout in parallel, thus requiring extensive readout control electronics. In daisy chain mode the output controls for the readout chip shift register and the sparse readout circuits can be daisy chained to each other. Therefore the readout proceeds as if all of the daisy chained chips are a single chip but with x number of channels, x being the number of individual chips times the number of channels per chip.

In another embodiment of the invention, an analog-to-digital converter is added to the readout chip. Thus the analog output is digitized within the chip, increasing processing speed as well as eliminating all outside electronics required to digitize the signal.

In the preferred embodiment, all of the comparators are externally adjusted with one voltage level for all comparator I's and another voltage for all comparator II's. In another embodiment of the invention, analog-to-digital converters are added to each comparator thus allowing the voltage threshold for each comparator to be separately set through external digital control. This embodiment is useful when different threshold are required for different channels within a single readout chip.

In the preferred embodiment, a test input is provided which is coupled to each channel input through a small capacitor. A test pulse supplied to this input can be used to test and/or calibrate the chip.

The specifications of the preferred embodiment of the readout chip are as follows:

| Process | 1, 1.2, or 1.5 micrometer CMOS |
|---|---|
| Number of channels | 64 |
| Peaking time | 4 selections<br>(200 ns, 500 ns, 1 μs, 4 μs) |
| Shaping | Shaping may be omitted if integration with pull to ground after readout is selected. |
| Data readout time | Dependent upon peaking time<br>(≈ 1 μs for 200 ns integration) |
| Noise | Approx. 100 to 300 electrons RMS + 10–20 electrons/pf |
| Power consumption | < 3 mW/channel |
| Input polarity | Either positive or negative inputs |
| Fast trigger output | Walk ≈ 5 to 10 ns |
| Slow trigger output | Eliminates spurious fast triggers and sets channel readout address |
| Comparator level | Externally adjustable from noise level to maximum level |
| Comparator drift | Stable to about 1% |
| Cross talk | ≦ 1% |
| Dark current drift | Provision is built in to the chip to eliminate premature channel firing due to an increase in noise on any channel. Accomplished by sending a command to turn off the offending channel. |
| Test input | Each channel connected to a test capacitor for testing and calibration |
| Input capacitance | Allowable range 0 to 100 pf |
| Data readout modes | - Sparse data readout: allows multi-hit events to be readout from channels which contain data without readout of those which do not contain data.<br>- Adjacent channel readout: readout of channels containing data as well as those channels immediately adjacent to data containing channels<br>- All channel readout: readout of all channels in sequence |
| Delay bet. channels | Approximately a 250 ns delay between reading the channels which contain data |
| Data presentation | Internal chip logic asserts trigger output when at least one comparator fires. It determines the address of the first channel with data, connects that channel to the output and waits for the handshake signal. When it receives the handshake signal it sends out the address of the second channel and connects that channel to the output. This proceeds until there are no more channels with data. When the last channel with data is reached a flag is raised to inform the external data acquisition system. The data acquisition system is required to send a clear signal to reset the chip. The chip will not receive any new event during the readout cycle until reset. |

As will be understood by those familiar with the art, the present invention may be embodied in other specific forms without departing from the spirit or essential characteristics thereof. Accordingly, disclosure of the preferred embodiment of the invention is intended to be illustrative, but not limiting, of the scope of the invention which is set forth in the following claims.

We claim:

1. A data readout integrated circuit coupled to a detector, said detector having a plurality of detector channels, said readout integrated circuit comprising:
   a plurality of channels formed in said integrated circuit, said plurality of integrated circuit channels corresponding to said plurality of detector channels;
   means for receiving detector input signals from at least some of said plurality of detector channels by said corresponding plurality of integrated circuit channels;
   a plurality of charge sensitive amplifiers corresponding to said plurality of integrated circuit channels, said charge sensitive amplifiers integrating said detector input signals;
   a plurality of two stage self trigger circuits corresponding to said plurality of integrated circuit channels, wherein a first stage of said two stage trigger circuits is a fast trigger for accurately timing said detector input signals, and wherein a second stage of said two stage trigger circuits is a slow trigger for accurately discriminating between said detector input signals and a false input signal; and
   means for outputting at least one of a plurality of analog signals associated with at least some of said plurality of integrated circuit channels and corresponding to said integrated detector signals.

2. The data readout integrated circuit of claim 1, further comprising a plurality of inverter amplifiers coupled to said plurality of charge sensitive amplifiers, each of said inverter amplifiers controlled by a signal external from said readout integrated circuit, said external signals reversing a polarity of said integrated detector signals.

3. The data readout integrated circuit of claim 1, further comprising a plurality of inverter amplifiers coupled to said plurality of charge sensitive amplifiers, said plurality of inverter amplifiers controlled by a signal external from said readout integrated circuit, said external signal reversing a polarity of said integrated detector signals.

4. The data readout integrated circuit of claim 1, further comprising at least one plurality of shaper amplifiers corresponding to said plurality of integrated circuit channels, said shaper amplifiers shaping said integrated detector signals.

5. The data readout integrated circuit of claim 4, wherein said shaped, integrated detector signals are of an approximately inverted bell shaped form.

6. The data readout integrated circuit of claim 1, wherein said detector is selected from the group consisting of silicon strip, silicon pixel, silicon drift, silicon PIN photodiodes, germanium, CdZnTe, CdTe, and $HgI_2$ detectors.

7. The data readout integrated circuit of claim 1, further comprising a first plurality of sample-and-hold circuits corresponding to said plurality of integrated circuit channels, said sample-and-hold circuits sampling said integrated detector signals.

8. The data readout integrated circuit of claim 7, further comprising a second plurality of sample-and-hold circuits corresponding to said plurality of integrated circuit channels, said second plurality of sample-and-hold circuits having an externally selectable delay, said second plurality of sample-and-hold circuits sampling a portion of said integrated detector signals, said portion to be sampled determined by said delay.

9. The data readout integrated circuit of claim 1, wherein said outputting means outputs an analog signal for each channel of said plurality of integrated circuit channels.

10. The data readout integrated circuit of claim 1, wherein said outputting means outputs an analog signal for each channel of said plurality of integrated circuit channels containing a detector input signal and does not output a signal for each channel of said plurality of integrated circuit channels which does not contain a detector input signal.

11. The data readout integrated circuit of claim 1, wherein said outputting means outputs an analog signal for each channel of said plurality of integrated circuit channels containing a detector input signal and outputs an analog signal for each channel of said plurality of integrated circuit channels adjacent to a channel containing a detector input signal.

12. The data readout integrated circuit of claim 1, further comprising means for receiving an externally applied serial code, said serial code for determining which of said plurality of integrated circuit channels is active and which of said plurality of integrated circuit channels is not active.

13. The data readout integrated circuit of claim 4, further comprising means for externally setting a peaking time for said plurality of shaper amplifiers, wherein said peaking time is approximately equivalent to an amount of time required for said detector input signals to arrive at said charge sensitive amplifiers.

14. The data readout integrated circuit of claim 1, wherein said plurality of fast triggers have an externally selectable threshold, said threshold for determining a signal level necessary to provide an accurate arrival time of said detector input signals at said charge sensitive amplifiers.

15. The data readout integrated circuit of claim 1, wherein said plurality of slow triggers have an externally selectable threshold, said threshold for determining a signal level necessary to identify a signal as a detector input signal.

16. The data readout integrated circuit of claim 1, wherein said plurality of slow triggers have an externally selectable threshold, said threshold for determining a signal level necessary to encode a channel address.

17. The data readout integrated circuit of claim 14, wherein said plurality of fast triggers have a first output signal level when said detector input signal is below said threshold and a second output signal level when said detector input signal is above said threshold level, wherein said first output signal level is within about 0.5 volts of said second output signal level.

18. The data readout integrated circuit of claim 1, further comprising an externally controlled gate within said slow trigger, said gate having an open and a closed position, wherein said closed gate prevents said slow trigger from mistakenly identifying said false input signal as said detector input signal.

19. The data readout integrated circuit of claim 1, further comprising an externally controlled gate before said slow trigger, said gate having an open and a closed position, wherein said closed gate prevents said slow trigger from mistakenly identifying said false input signal as said detector input signal.

20. The data readout integrated circuit of claim 1, further comprising an externally controlled gate after said slow trigger, said gate having an open and a closed position, wherein said closed gate prevents said slow trigger from mistakenly identifying said false input signal as said detector input signal.

21. The data readout integrated circuit of claim 1, further comprising:
a plurality of analog-to-digital converters corresponding to said plurality of integrated circuit channels, wherein said analog-to-digital converters convert said analog output signals to digital output signals; and
means for outputting at least one of a plurality of digital signals associated with at least some of said plurality of integrated circuit channels and corresponding to said detector input signals.

22. The data readout integrated circuit of claim 1, wherein each of said fast triggers and each of said slow triggers has an individually and externally selectable threshold, wherein said fast trigger thresholds determine a signal level necessary to provide an accurate arrival time of said detector input signals at said charge sensitive amplifiers, and wherein said slow trigger thresholds determine a signal level necessary to catagorize a signal as a detector input signal.

23. The data readout integrated circuit of claim 1, further comprising a plurality of peak holding circuits corresponding to said plurality of integrated circuit channels.

* * * * *

UNITED STATES PATENT AND TRADEMARK OFFICE
CERTIFICATE OF CORRECTION

PATENT NO. : 5,696,458
DATED : December 9, 1997
INVENTOR(S) : Tümay O. Tümer

It is certified that error appears in the above-identified patent and that said Letters Patent is hereby corrected as shown below:

At column 1, line 2, insert the following:

-- GOVERNMENT RIGHTS NOTICE

This invention was made with U.S. Government support under Contract Numbers R43MH49923, DASGG60-92-V-0200, and DAMD17-96-1-6256. The first contract was awarded by the Department of Health and Human Services. The second and third contracts were awarded by the Department of Defense. The U.S. Government has certain rights in the invention.--

Signed and Sealed this

Twentieth Day of October, 1998

Attest:

BRUCE LEHMAN

*Attesting Officer*  *Commissioner of Patents and Trademarks*